United States Patent [19]

Miklas et al.

[11] Patent Number: 5,679,301

[45] Date of Patent: Oct. 21, 1997

[54] METHOD FOR MOLDING A MULTILAYERED TRIM COMPONENT

[75] Inventors: John Louis Miklas, Clinton Twp.; Thomas Junior Luckett, Westland, both of Mich.

[73] Assignee: Ford Motor Company, Dearborn, Mich.

[21] Appl. No.: 369,631

[22] Filed: Jan. 6, 1995

[51] Int. Cl.$^6$ ............................ B29C 45/14; B29C 45/16
[52] U.S. Cl. .................... 264/161; 264/266; 264/275
[58] Field of Search ............................ 264/259, 266, 264/328.7, 163, 250, 255, 294, 161, 275, 278; 425/112, 125, 128, 130

[56] References Cited

U.S. PATENT DOCUMENTS

| | | | |
|---|---|---|---|
| 3,661,684 | 5/1972 | Rallis et al. | 156/583 |
| 4,873,045 | 10/1989 | Fujita et al. | 264/259 |
| 4,968,474 | 11/1990 | Ito | 264/266 |
| 5,080,742 | 1/1992 | Takahashi | 156/212 |
| 5,091,031 | 2/1992 | Strapazzini | 156/211 |
| 5,139,604 | 8/1992 | Mitchell | 156/479 |
| 5,209,880 | 5/1993 | Miwa | 264/266 |
| 5,238,640 | 8/1993 | Masui et al. | 425/112 |
| 5,292,465 | 3/1994 | Kobayashi et al. | 264/328.7 |
| 5,326,523 | 7/1994 | Gustavel et al. | 264/163 |
| 5,352,397 | 10/1994 | Hara et al. | 264/163 |
| 5,354,397 | 10/1994 | Miyake et al. | 264/266 |
| 5,395,580 | 3/1995 | Morita et al. | 264/266 |

FOREIGN PATENT DOCUMENTS

| | | |
|---|---|---|
| A 0 186 016 | 7/1986 | European Pat. Off. . |
| A 0 497 335 | 8/1992 | European Pat. Off. . |
| A 2 688 442 | 9/1993 | France . |
| 3434366A1 | 8/1985 | Germany . |
| A 40 33 297 | 5/1991 | Germany . |
| A 41 20 880 | 7/1992 | Germany . |
| 41 27 241 | 2/1993 | Germany . |
| 63-212521 | 12/1988 | Japan . |
| WO 94/03337 | 2/1994 | WIPO . |

OTHER PUBLICATIONS

S. Masui, T. Hara, M. Matsumoto, "New Thermoplastics Processing Technology SP–Mold," SPI Structural Plastics Div. Conference, Apr. 4–8, 1992, Dallas, TX, pp. 1–7.

*Primary Examiner*—Jan H. Silbaugh
*Assistant Examiner*—Angela Ortiz
*Attorney, Agent, or Firm*—Damian Porcari

[57] ABSTRACT

A method and apparatus (10) for molding a multilayered automotive trim component (12) having a covered edge portion (60). A flexible covering (32) is positioned between opposable molds (14, 16) that are continuously operable between an open position and a closed position. First and second article shaping surfaces (18, 20) on the molds (14, 16) form the article surfaces. An extendable slide (22, 23) having a cover receiving surface (24, 25) is positioned between the molds (14, 16) such that the cover receiving surface (24, 25) is positioned inwardly of a perimeter portion (26) of the first article shaping surface (18). The slide (22, 23) is extended and a polymeric resin (48) is injected onto the second article-shaping surface (20). The molds (14, 16) are closed such that the first and second article-shaping surfaces (18, 20) and the cover-receiving surface (24, 25) together define a cavity (52). The resin (48) is compressed within the cavity (52) and urges the covering (32) against the first article-shaping surface (18) and the cover-receiving surface (24, 25) to form a substrate layer (56) having a first covered surface (58) conforming to the first article-shaping surface (18) and a second covered surface (60) conforming to the cover-receiving surface (24, 25). The second covered surface (60) is generally opposite of the first covered surface (58). The slide (22, 23) is retracted sufficiently to remove the component (12) from the molds (14, 16).

1 Claim, 2 Drawing Sheets

METHOD FOR MOLDING A MULTILAYERED TRIM COMPONENT

BACKGROUND OF THE INVENTION

1. Field of the Invention

This invention relates to molding an automotive trim component having a rigid substrate layer and a flexible covering. More particularly, the invention relates to an apparatus and method for molding the flexible covering around an edge of the rigid substrate.

2. Description of Related Art

Automotive trim components, such as door panels, instrument panels and consoles, typically have a multilayered structure comprising a rigid polymeric substrate layer and a decorative flexible covering. Low pressure molding, or compression injection molding, is currently used in the manufacture of these components to integrally mold the flexible covering to a surface of the substrate layer. An advantage of the low pressure molding process is that the layers can be molded simultaneously. No pre-forming of either the covering or the substrate is required.

Heretofore, however, low pressure molding equipment has not included in-mold means for folding the covering around the perimeter edges of the substrate. Therefore, a separate edge folding operation has typically been conducted, following the removal of the component from the molding equipment, to improve the appearance of the component for automotive interior applications. In this operation, the ends of the covering are folded around the perimeter edges of the substrate and affixed to a surface opposite the covered surface of the substrate. This process is accomplished manually, by mechanical means through the use of auxiliary equipment, or by a combination of the two methods. The use of primers and adhesives is typically required to secure the ends of the covering to the substrate. Alternatively, when the covering includes a foam backing, the covering may be secured to the substrate by heating the foam and fusing it to the substrate. While this heating method eliminates the need for primers and adhesives, the method still requires significant post-mold processing, and material selection is limited to compatible foams and substrates.

While not teaching low pressure molding or edge folding, U.S. Pat. No. 3,661,684, issued to Rallis et al. (Rallis) teaches molding an upholstered article in a single mold. Sliding sealing bars secure a covering to a thermoplastic cap sheet and are then retracted to remove the upholstered article from the mold. The slide creates a hidden seam between the covering and cap sheet. Rallis does not teach simultaneously molding and covering the edges of a rigid substrate nor using slides to impart shape to the substrate.

From the foregoing, it can be seen that the post-mold edge folding operation increases the cost, complexity and cycle time required to manufacture the component. It would be desirable therefore to develop an apparatus and process for manufacturing an automotive trim component that enables the covering to be integrally molded to opposite surfaces of the substrate during the molding process.

SUMMARY OF THE INVENTION

The present invention overcomes the difficulties of the prior art by providing a method and apparatus for molding a multilayered automotive trim component having a covered edge. The article is made from a rigid substrate layer and a flexible covering. The covering is positioned between opposable molds that are continuously operable between an open position and a closed position. First and second article shaping surfaces on the molds form the article surfaces. An extendable slide having a cover receiving surface is positioned between the molds such that the cover receiving surface is positioned inwardly of a perimeter portion of the first article shaping surface. The slide is extended and a polymeric resin is injected onto the second article-shaping surface. The molds are closed such that the first and second article-shaping surfaces and the cover-receiving surface together define a cavity. The resin is compressed within the cavity and urges the covering against the first article-shaping surface and the cover-receiving surface to form a substrate layer having a first covered surface conforming to the first article-shaping surface and a second covered surface conforming to the cover-receiving surface. The second covered surface is generally opposite of the first covered surface. The slide is retracted sufficiently to remove the component from the molds.

An apparatus for practicing the above-described method uses opposable first and second molds continuously operable between open and closed positions. A first article-shaping surface of the first mold forms a first covered surface of the component. A slide, movable between the first and second molds, includes a cover-receiving surface for forming a second covered surface on the substrate. The cover-receiving surface is positioned inwardly of the mold perimeter when the slide is in an extended position and outwardly of the perimeter when the slide is in a retracted position. The first and second article-shaping surfaces and the cover-receiving surface together define a cavity when the molds are closed and the slide is extended. A resin inlet to the second article-shaping surface injects resin to form the component.

An alternative embodiment of the invention teaches molding the component with a covered flash portion. A pocket between the slide and the second article-shaping surface receives resin to form the covered flash portion. The flash provides a rigid backing to assist in removing the excess covering.

The method and apparatus of the present invention permit the manufacture of covered substrates having a nearly finished edge. The component includes a second covered surface generally opposite the first decorative surface of the component. The first and second surfaces are simultaneously integrally molded to the substrate. The final finishing process merely requires trimming an excess portion of covering. The invention eliminates the need for adhesives, fasteners or post molding folding operations. The resulting component is more economical to produce and displays a neat edge appearance. These and other benefits of the present invention are more fully described below.

DETAILED DESCRIPTION OF THE PREFERRED EMBODIMENTS

Figure 1:
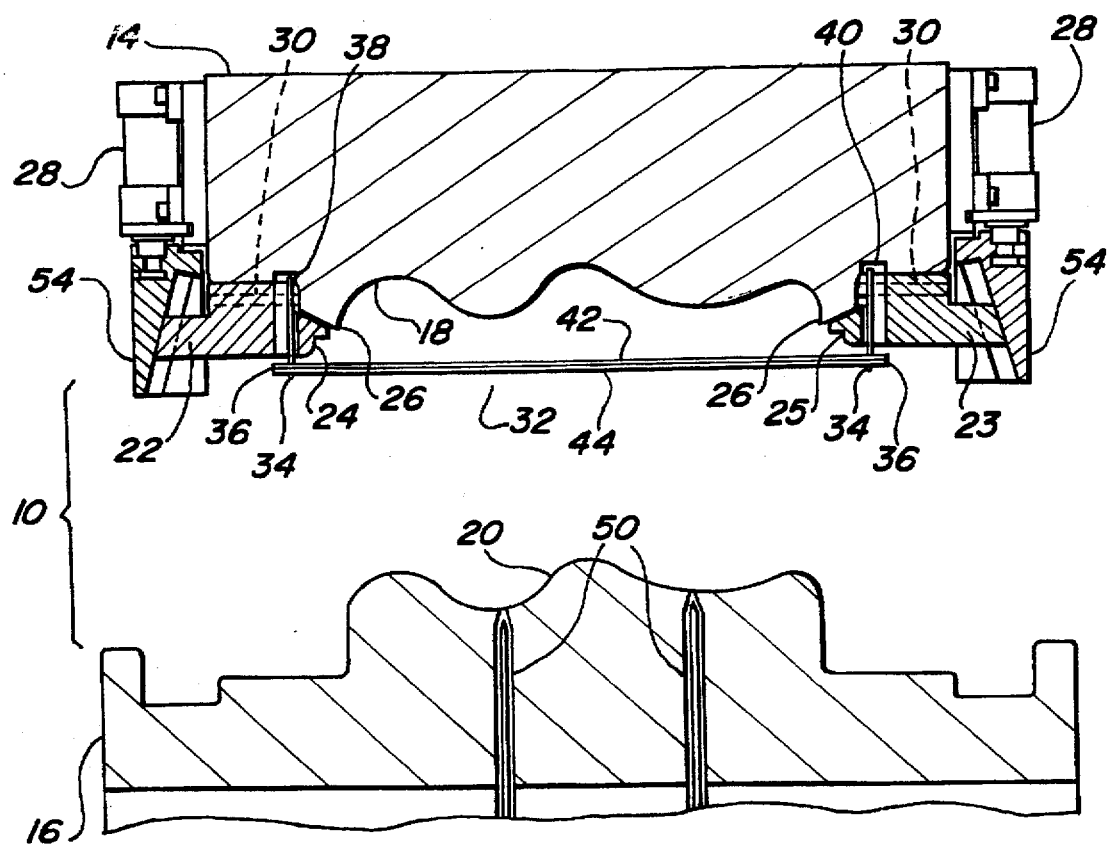
FIG. 1 is a cross-sectional view of an apparatus having opposable molds and movable slides, wherein the molds are open and the slides are retracted.
Figure 2:
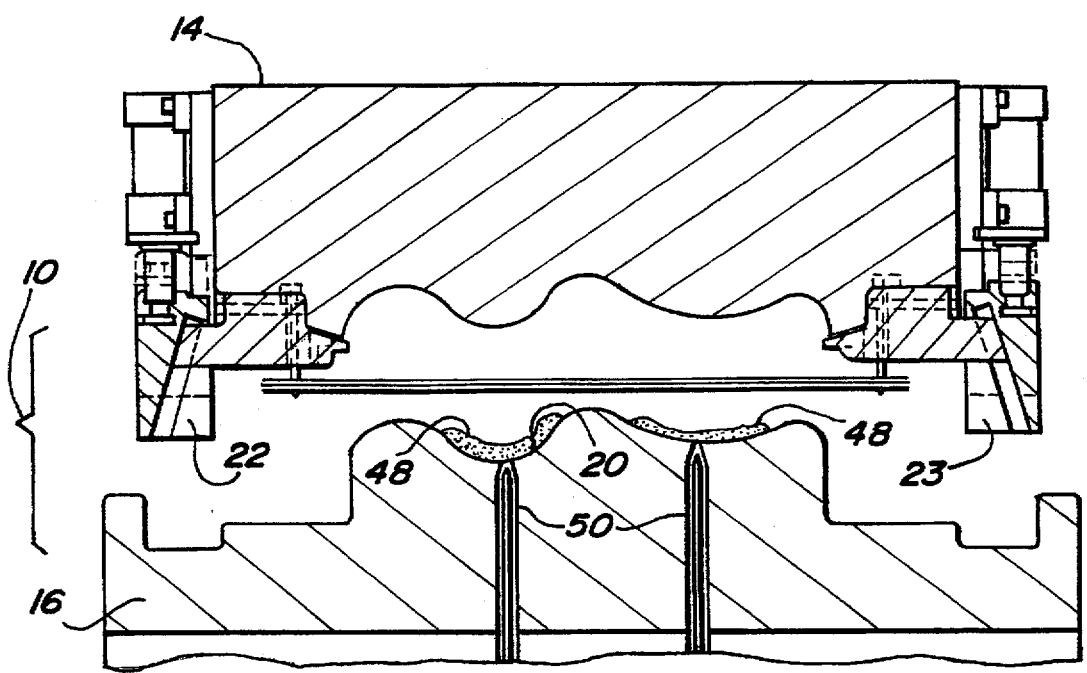
FIG. 2 is a cross-sectional view of the apparatus illustrated in FIG. 1, showing the extension of the slides and the injection of a substrate resin while the molds are in a partially closed position.
Figure 3:
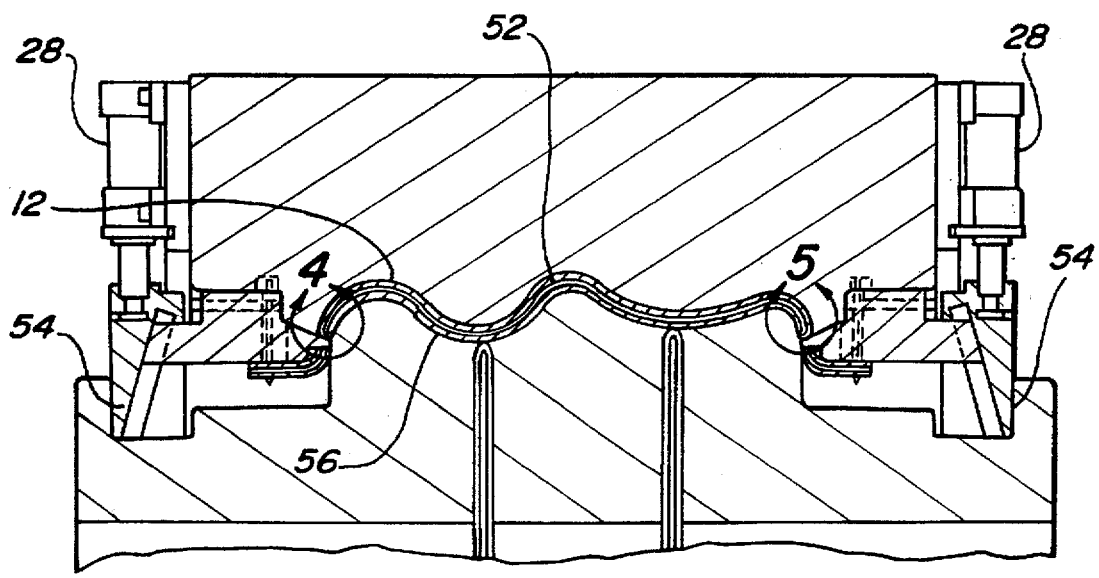
FIG. 3 is a cross-sectional view of the apparatus illustrated in FIG. 1, showing the molding of a trim component.

FIGS. 1–3 illustrate an apparatus 10 for the low pressure molding of multilayered automotive trim component 12. Apparatus 10 comprises opposable molds 14, 16 having first and second article-shaping surfaces 18, 20. Molds 14, 16 are operable by a hydraulic press (not shown) through a continuous range of positions from an open position to a closed position. FIGS. 1, 2 and 3 show molds 14, 16 in an open position, a partially closed position and a closed position, respectively.

Apparatus 10 further comprises slides 22, 23 having cover-receiving surfaces 24, 25. Slides 22, 23 are movable between molds 14, 16 such that cover-receiving surfaces 24, 25 are positioned inwardly of perimeter 26 of article-shaping surface 18 when slides 22, 23 are in an extended position and outwardly of perimeter 26 when slides 22, 23 are in a retracted position. Hydraulic cylinders 28 operate to extend and retract slides 22, 23. Cylinders 28 may be mounted vertically, as shown, or horizontally. The extending and retracting movement of slides 22, 23 is guided through the provision of appropriate guideways as indicated at 30 in FIGS. 1–3.

Additional features of apparatus 10 will be described hereinbelow in relation to the process steps illustrated in FIGS. 1–5. Referring first to FIG. 1, apparatus 10 is shown with molds 14, 16 in an open position. Flexible covering 32, which comprises an outer layer 42 and a backing 44, is positioned by retainers 34 between molds 14, 16 such that outer layer 42 faces article-shaping surface 18. Retainers 34 are mounted to mold 14 outwardly of perimeter 26 and secure excess portions 36 of covering 32. Retainers 34 extend through slots 38, 40 provided in slides 22, 23. Slots 38, 40 have a width greater than or equal to the distance traveled by slides 22, 23 in moving between the extended and retracted positions. FIG. 1 shows slides 22, 23 in a retracted position. Alternatively, one or both slides 22, 23 could be extended prior to the positioning of covering 32.

FIG. 2 shows slides 22, 23 moving to an extended position and molds 14, 16 in a partially closed position. A polymeric resin 48 is injected through resin inlets 50 onto article-shaping surface 20. Resin 48 may be injected while the molds are fixed a suitable distance apart in a partially closed position, or alternatively, resin 48 may be injected as molds 14, 16 move to a closed position. Resin 48 is completely injected before molds 14, 16 reach the closed position.

One or both slides 22, 23 may be extended before resin 48 is injected. Alternatively, slides 22, 23 may be extended and resin 48 injected simultaneously. The precise timing of slide extension, mold closing and resin injection is dependent on the component shape, resin inlet location and the elasticity of covering 32. Extension of slides 22, 23 causes excess portion 36 to be pinched between the slides and second article-shaping surface 20 as shown in FIG. 3. Delaying the slide extension permits more of covering 32 to be drawn into the molds and reduces stretching of covering 32. Early slide extension pinches excess portion 36 and increases the amount of stretching applied to cover 32.

When molds 14, 16 reach a closed position, article-shaping surfaces 18, 20 and cover-receiving surfaces 24, 25 cooperate to define a mold cavity 52. Slides 22, 23 are fully extended and pinch covering 32 between the slides and second article-shaping surface to seal cavity 52 and prevent the escape of resin from the molds. Resin 48 is compressed and urges covering 32 firmly against article-shaping surface 18 and cover-receiving surfaces 24, 25.

The compression pressure is dependent on material selection, the size and shape of the article, the resin fill volume, and the molding temperatures. To prevent slides 22, 23 from moving outward while compression pressure is being applied, vertically mounted cylinders 28 are equipped with locking mechanisms 54 which seat in mold 16.

Figure 4:
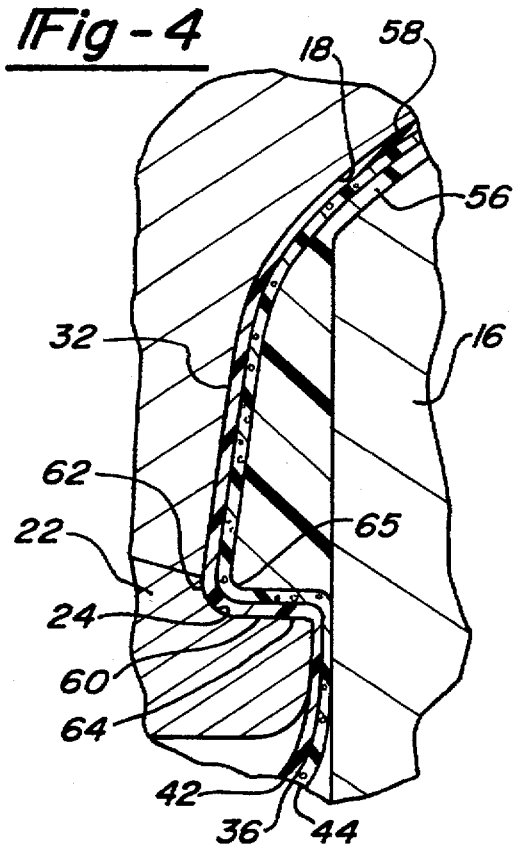
FIG. 4 is an enlarged view of the area labeled 4 in FIG. 3.

Upon cooling, resin 48 forms rigid substrate layer 56. As shown in FIG. 4, substrate layer 56 is molded such that it has a first covered surface 58 conforming to article-shaping surface 18 and a second covered surface 60 conforming to cover-receiving surface 24. Covered surface 60 is generally opposite covered surface 58.

FIG. 4 further shows a concave curved portion 62 and an elongated portion 64 of cover-receiving surface 24. Curved portion 62 is provided to reduce the stretching of covering 32 during the molding of edge 65 of substrate layer 56. The actual curvature of portion 62 will be determined by the stretch characteristics of covering 32. Generally, a low stretch material will require a larger radius of curvature than a high stretch material. Elongated portion 64 is located inwardly of curved portion 62 and is sized to form a second covered surface of a desired length.

Figure 5:
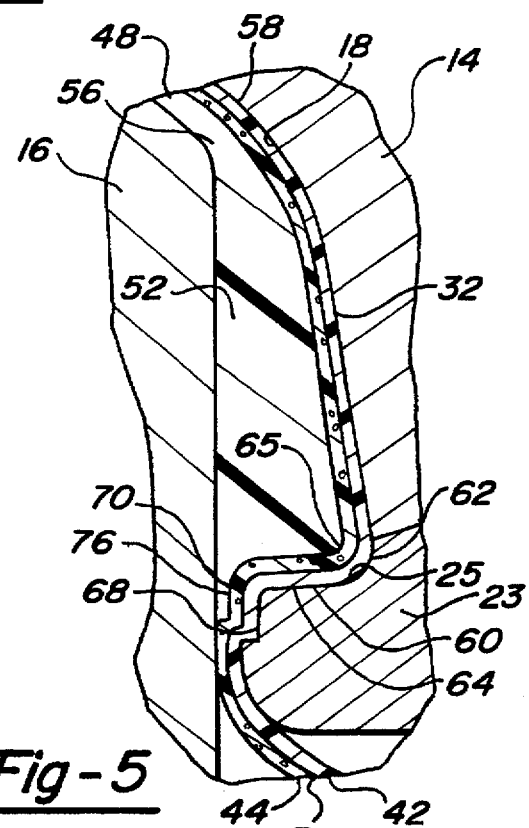
FIG. 5 is an enlarged view of the area labeled 5 in FIG. 3, showing an alternative embodiment of the invention.

As illustrated in FIGS. 4 and 5, covering 32 has an unbonded excess portion 36 that extends beyond second covered surface 60. Excess portion 36 seals the space between slides 22, 23 and mold 16 during the molding process.

FIG. 5 shows another embodiment of the invention in which slide 23 has an indented portion 68 positioned inwardly of cover-receiving surface 25. Indented portion 68 and article-shaping surface 20 together define a pocket 70 within mold cavity 52. As molds 14, 16 move to a fully closed position, compressed resin 48 flows into pocket 70 and urges covering 32 against indented portion 68. Upon cooling, resin 48 and covering 32 in pocket 70 combine to form a covered flash portion 76. Because of the relative size, compression pressure in pocket 70 is generally greater than the pressure within cavity 52. Resin partially imbeds into backing 44 and provides a firm base for latter trimming operations.

After component 12 has sufficiently cooled, slides 22, 23 are retracted to permit removal of component 12 from molds 14, 16. Component 12 includes excess portion 36 of covering 32 and optionally also includes covered flash portion 76. Both excess portion 36 and flash portion 76 can then be trimmed off to finish component 12. Various conventional cutting means may be used, including water jets, hot knives, and punch presses. Components having a flash portion 76 advantageously provide a rigid cutting surface to facilitate the trimming operation and better resist delamination between covering 32 and substrate 56. Resin impregnating backing 44 during the molding of flash portion 76 makes the backing less elastic and less prone to being exposed in the event of shrinkage of covering 32.

Figure 6:
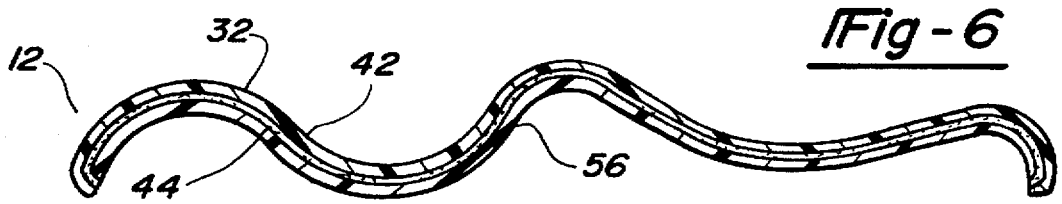
FIG. 6 is a cross-sectional view of a finished trim component.

FIG. 6 shows component 12 following the trimming operation. As illustrated, covering 32 contains outer layer 42 and backing 44. A wide variety of materials may be used for outer layer 42, including thermoplastic materials, leather, suede and cloth. Suitable thermoplastic materials include polyolefins, thermoelastomers and vinyls. Suitable materials for backing 44 include thermoplastic foams and cloth. Suitable materials for rigid substrate layer 56 include polymeric resins such as polypropylene.

While the present invention has been illustrated using two slides, it will be readily apparent to those ordinarily skilled in the art that the number of slides required will depend on the component to be molded. In addition, while the slides are illustrated as extending and retracting in a direction substantially perpendicular to the draw of the molds, the slides could, alternatively, be extended and retracted at another angle in order to change the shape of the second covered surface.

Furthermore, although the retainers 34 have been illustrated as pins mounted to mold 14, various alternative retaining means my be used. For example, the pins could be mounted to a spring-loaded frame to reduce the stretching of the covering that occurs during the closing of the molds. In addition, clamps or pincers could be used in place of pins. These pincers could be actuated by a hydraulic cylinder to modify the clamping pressure during the course of the process.

The foregoing description illustrates the preferred embodiments of the present invention. Modifications and variations of the invention are possible without departing from the spirit and scope of the following claims.

What is claimed is:

1. A method of molding a multilayered automotive trim component having a rigid substrate layer and a flexible covering, said covering including an outer layer and a backing, said method comprising the steps of:

providing opposable molds continuously operable between an open position and a closed position, wherein said molds have first and second article-shaping surfaces and said first article-shaping surface has a perimeter;

positioning said covering between said molds such that said outer layer faces said first article-shaping surface;

securing excess portions of said covering with pins mounted to one of said molds outwardly of said perimeter;

extending a slide having a cover-receiving surface and an indented portion between said molds after said positioning and securing steps such that said cover-receiving surface and said indented portion are positioned inwardly of said perimeter;

injecting a polymeric resin onto said second article-shaping surface while said molds are in a partially closed position;

closing said molds such that said first and second article-shaping surfaces and said cover-receiving surface together define a cavity, said cavity having a pocket defined by said second article-shaping surface and said indented portion;

compressing said resin and urging said covering against said first article-shaping surface, said cover-receiving surface and said indented portion, said resin impregnating said backing in said pocket;

forming a substrate layer having a first covered surface conforming to said first article-shaping surface, a second covered surface conforming to said cover-receiving surface, said second covered surface being generally opposite said first covered surface;

forming flash on a portion of said covering, said covered flash portion conforming to said pocket;

retracting said slide such that said cover-receiving surface and said indented portion are positioned outwardly of said perimeter to permit removal of said component from said molds; and trimming said covered flash portion from said component, whereby said covered flash portion provides a rigid cutting surface to facilitate the trimming step.

* * * * *